US 8,311,728 B2

(12) United States Patent
Coatantiec et al.

(10) Patent No.: US 8,311,728 B2
(45) Date of Patent: Nov. 13, 2012

(54) NAVIGATION SYSTEM USING HYBRIDIZATION BY PHASE MEASUREMENTS

(75) Inventors: Jacques Coatantiec, Fauconnieres (FR); Sébastien Juillaguet, Bourg de Peage (FR)

(73) Assignee: Thales, Neuilly-sur-Seine (FR)

( * ) Notice: Subject to any disclaimer, the term of this patent is extended or adjusted under 35 U.S.C. 154(b) by 135 days.

(21) Appl. No.: 12/918,204

(22) PCT Filed: Feb. 18, 2009

(86) PCT No.: PCT/EP2009/051938
§ 371 (c)(1),
(2), (4) Date: Aug. 18, 2010

(87) PCT Pub. No.: WO2009/103745
PCT Pub. Date: Aug. 27, 2009

(65) Prior Publication Data
US 2010/0324822 A1 Dec. 23, 2010

(30) Foreign Application Priority Data
Feb. 19, 2008 (FR) .................................. 08 00883

(51) Int. Cl.
*G01C 21/00* (2006.01)
(52) U.S. Cl. ...................................................... 701/216
(58) Field of Classification Search .................. None
See application file for complete search history.

(56) References Cited

U.S. PATENT DOCUMENTS

| 5,995,040 A * | 11/1999 | Issler et al. ..................... 342/352 |
| 7,418,346 B2 * | 8/2008 | Breed et al. .................... 701/301 |
| 8,068,984 B2 * | 11/2011 | Smith et al. .................... 701/472 |
| 2001/0020216 A1 | 9/2001 | Lin |
| 2004/0239560 A1 | 12/2004 | Coatantiec et al. |
| 2007/0211793 A1 | 9/2007 | Han |

FOREIGN PATENT DOCUMENTS

| EP | 1 571 460 A2 | 9/2005 |
| FR | 2 830 320 A1 | 4/2003 |

OTHER PUBLICATIONS

D. Kaplan, et al., "Understanding GPS—Principles and Applications", 1996, pp. 190-193, Artech House, Inc., US, XP002509171.

* cited by examiner

Primary Examiner — Thomas Tarcza
Assistant Examiner — Nagi Alharbi
(74) Attorney, Agent, or Firm — Baker & Hostetler LLP (57) ABSTRACT

The invention relates to a navigation system for aircraft comprising inertial sensors, a GNSS receiver and potentially a baro-altimeter. The measurements from the inertial sensors are hybridized with the code and phase measurements from the receiver within a main Kalman filter and, possibly, secondary filters. The said measurements are corrected for several types of errors, notably those due to the passage of the satellite signals through the ionospheric layers. The precision of the determination of the position of the aircraft is greatly improved, both in the horizontal plane and in the vertical direction. This is also the case for the corresponding protection radii, which allows margins to be created in order to satisfy the integrity constraints for the navigation solution.

21 Claims, 7 Drawing Sheets

NAVIGATION SYSTEM USING HYBRIDIZATION BY PHASE MEASUREMENTS

CROSS-REFERENCE TO RELATED APPLICATIONS

This application is a National Stage of International patent application PCT/EP2009/051938, filed on Feb. 18, 2009, which claims priority to foreign French patent application No. FR 08 00883, filed on Feb. 19, 2008, the disclosures of which are incorporated by reference in their entirety.

FIELD OF THE INVENTION

The present invention relates to aircraft navigation systems.

BACKGROUND OF THE INVENTION

The present invention is applicable to the field of aircraft navigation systems. More particularly, when the demands on precision and integrity are greatest, in the approach and take-off phases, satellite navigation systems of the GNSS type (Global Navigation Satellite System, comprising the Global Positioning System constellations—GPS, GLONASS—Russian version of the GNSS—and in the future Galileo and Beidou, the future European and Chinese constellations; the invention would in fact be applicable to any satellite navigation system) are currently not able to guarantee the precisions and integrities required by the safety standards. Precision augmentation systems may be used such as GBAS (Ground Based Augmentation System) or SBAS (Satellite Based Augmentation System), but these systems are only available in areas that are specifically equipped. The present invention belongs to the family of ABAS (Airborne Based Augmentation Systems). Conventional hybridization techniques, based on a combination of inertial sensor measurements, such as gyrometers and accelerometers, with position, speed and attitude measurements extracted from the processing of the civilian codes transmitted by the satellites, are no longer adapted to these flight phases with severe demands on precision and integrity, notably because the errors in the positioning system are significantly affected in these flight phases by the errors due to propagation in the ionosphere and to the multiple pathways which indeed form the major parts of the measurement errors of the GNSS receiver in flight and on the ground, respectively.

SUMMARY OF THE INVENTION

The invention solves this problem by providing hybridized positioning measurements which meet the precision and integrity requirements even in the presence of ionospheric errors. It also protects from the effects of the majority of the multiple pathways.

For this purpose, the invention discloses a navigation system for a moving craft comprising a first positioning module using processing of inertial sensor measurements, a second positioning module comprising at least one multi-channel radiofrequency receiver, each channel being capable of acquiring and tracking at least one carrier received from a satellite, of measuring its phase and of demodulating its signal in order to recover at least one modulation code, and one module for calculating navigation solutions by hybridization in at least one Kalman filter of the results from the first module with those of the second module, characterized in that the module for calculating the navigation solution includes in the hybridization at least one measurement of pathway increment carried out on at least one channel by integration of the measurements of the carrier phase tracked by the said channel.

Advantageously, at least one of the variables of the state vector of at least one of the Kalman filters of the navigation system according to the invention represents a part of the errors on the code and phase measurements from the second positioning module due to the passage through the ionospheric layers of the atmosphere.

Advantageously, the state variable or variables representing a part of the errors on the code and phase measurements from the second positioning module due to the passage through the ionospheric layers of the atmosphere are chosen from within the group comprising the ionospheric bias on the measurement of the code, the ionospheric bias on the measurement of the phase and the variation of the ionospheric environment.

Advantageously, a part of the errors on the code and phase measurements from the second positioning module due to the multiple pathways of the signals received by the navigation system according to the invention are modelled in the calculation module for the navigation solution by two states, one for the code and one for the phase.

Advantageously, at least one of the variables of the state vector of at least one of the Kalman filters of the navigation system according to the invention represents, at least partially, a part of the errors on the code and phase measurements from the second positioning module due to the errors in the satellite clock and in the ephemerides transmitted by the satellites.

Advantageously, the internal errors of the receiver of the navigation system according to the invention comprise the error due to the receiver clock, the error due to the thermal noise of the said receiver and the residual error due to the processing loops of the said receiver.

Advantageously, the errors in the processing loops of the navigation system according to the invention due to the dynamic behaviour of the aircraft are corrected by widening the range of variance of the loop noise as a function of the said dynamic behaviour.

Advantageously, the PLL errors of the navigation system according to the invention due to the impact of a noisy signal are taken into account by rejecting the phase measurement variations corresponding to a low signal-to-noise ratio.

Advantageously, the management structure of the receiver channels allows them to supply measurements meeting any given quality criteria.

Advantageously, the measurements of one channel are only used after a chosen delay following the reception of the indication of the availability status of the said channel.

Advantageously, the measurements of one channel are only used beyond chosen thresholds in elevation of the satellite being tracked and in signal-to-noise ratio of the received signal.

Advantageously, the results from the calculation module for the navigation solution are supplied to the first positioning module for correcting its measurements.

Advantageously, the navigation system according to the invention comprises N Kalman filters in addition to the at least one hybridization Kalman filter, one per channel corresponding to a satellite in view.

Advantageously, the N Kalman filters are used for the calculation of the horizontal and vertical protection radii of the navigation solution.

Advantageously, the results from the calculation module are not supplied to the second module in order to modify its measurements.

Advantageously, the navigation system according to the invention comprises at least one narrow double-delta correlator.

Advantageously, a partial navigation solution is calculated at the output of the second positioning module prior to being hybridized with the outputs of the first positioning module.

Advantageously, the second positioning module of the navigation system according to the invention also comprises a baro-altimetric measurement sensor.

Advantageously, at least one of the variables of the state vector of at least one of the Kalman filters of the navigation system according to the invention represents a part of the errors on the measurements from the baro-altimetric sensor.

Advantageously, at least one of the variables of the state vector of at least one of the Kalman filters of the navigation system according to the invention represents a part of the errors on the measurements from the inertial sensors.

The invention also discloses a navigation method for a moving craft comprising a first positioning step using processing of inertial sensor measurements, a second positioning step comprising at least one multi-channel radiofrequency reception step, each channel being capable of acquiring and tracking at least one carrier received from a satellite, of measuring its phase and of demodulating the signal in order to recover at least one modulation code, and a navigation solution calculation step using hybridization in at least one Kalman filter of the results from the first step with those of the second step, characterized in that the navigation solution calculation step includes in the hybridization at least one measurement of pathway increment carried out on at least one channel by integration of the measurements of the carrier phase tracked by the said channel.

The invention also has the advantage that the corrections carried out on the errors in the inertial sensors and in the GNSS receiver complement the corrections stipulated in the standards ARINC and RTCA and are therefore readily coherent with them.

BRIEF DESCRIPTION OF THE DRAWINGS

The invention will be better understood and its various features and advantages will become apparent from the following description of several exemplary embodiments and of their appended figures, in which.

DETAILED DESCRIPTION

Unless stated otherwise, in the description and the figures, the acronyms and abbreviations have the meanings indicated in the table below:

| Abbreviation/Acronym | Meaning |
| --- | --- |
| ABAS | Airborne Based Augmentation System |
| ACP | Accumulated Carrier Phase |
| ARINC | Aeronautical Radio, Incorporated |
| C/A | Coarse/Acquisition Code |
| DDC | Double-Delta Correlator |
| DLL | Delay-Locked Loop |
| ECEF | Earth Centred Earth Fixed |
| FF | Fault Free |
| GBAS | Ground Based Augmentation System |
| GNSS | Global Navigation Satellite System |
| GPS | Global Positioning System |
| IMU | Inertial Measurement Unit |
| OCXO | Oven Controlled crystal Oscillator |
| P | Precision code |
| VPF | Virtual Platform |
| PQR | Rotation vector components |
| PRN | Pseudo Random Noise |
| TSP | Time Speed Position |
| RNP | Required Navigation Performance |
| RTCA | Radio Technical Commission for Aeronautics |
| SBAS | Satellite Based Augmentation System |
| SF | Satellite Failure |
| TCXO | Temperature Compensated crystal Oscillator |
| TLM | Telemetry |

Figure 1:
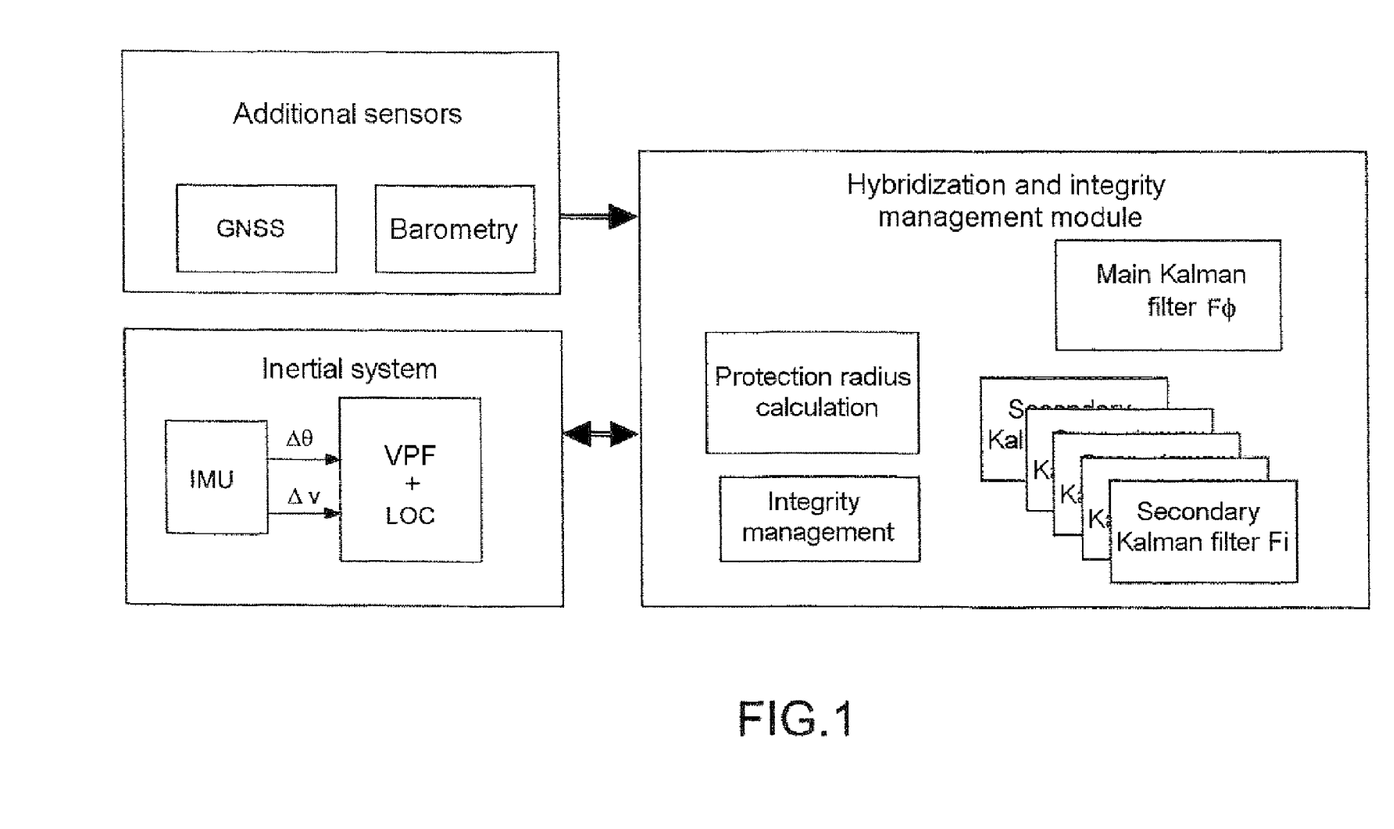
FIG. 1 shows the general architecture of a navigation system with GNSS/inertial sensors hybridization.

FIG. 1 describes the basic architecture of an aircraft navigation system based on the calculation of a solution using inertial sensors and of a satellite navigation system. The inertial sensors principally comprise a three-axis gyroscope and at least 3 accelerometers (IMU, 10). These sensors provide an estimation of the angular variation of the spatial orientation of the carrier ($\Delta\theta$) and of its linear acceleration ($\Delta V$) to a virtual platform (VPF) and a unit for calculating the localization of the aircraft (LOC). The inertial sensors produce navigation parameters which are not affected by random variations in transmission and are very precise in the short term but which drift over the long term.

These errors in the inertial sensors must be modelled in the main hybridization filter F0 in order to be corrected. The standard ARINC 738 defines the type of errors in the inertial sensors generally composed of gyrometers and accelerometers. The main defects in the measurements of a gyrometer comprise: the drift (in degrees per hour) which is the difference between the bias of two measurements at moments when the gyrometer is turned on; the stability in operation (in degrees per hour); the random walk (in degrees per square root hour) which is the result of the integration of a white noise signal; the scale factor (in parts per million) which represents the variation of the real measurement of the sensor; the misalignment (in micro-radians) which is the angular difference between the real orientation of the sensor and its theoretical orientation. The main defects in the measurements of an accelerometer comprise: the bias of the accelerometer (in g) which is the equivalent of the drift of the gyrometer; the stability of the accelerometer bias which is the equivalent of the stability of the gyrometer; the scale factor and the misalignment, equivalent to the identical definitions for the gyrometer; the noise. A certain number of standard assumptions are generally made, according to the knowledge of those skilled in the art, for the values of the parameters of these defects.

A GNSS system 210 supplies the pseudo-distances and the pseudo-speeds with respect to the satellites along a viewing axis from the carrier of the receiver (pseudo meaning relative with respect to the said satellite in view). These measurements are periodically reset taking into account various errors which will be discussed below. The data produced by the GNSS receiver, which are used in the later calculations of the navigation solution, will also be discussed below.

The GNSS measurements can be completed by baro-altimetric measurements. The measurements of the baro-altimeter 220 are very important on an aircraft. In particular, they provide information to the flight management application. These measurements are generally supplied by more than one sensor which allows their coherence to be verified. One of the difficulties is however that the error in the baro-altimetric sensors is dependent on the local atmospheric conditions. The ICAO proposes the following error model:

$$\sigma_{Zb} = \sqrt{\sigma_0^2 + \sigma_{Vert}^2 + \sigma_{Hor}^2 + \sigma_{Time}^2}$$

where $\sigma_0$ is the initial error $\sigma_{Hor} = Kh*\Delta Pos_{hor}$ represents the influence of the horizontal distance between the current position and the last position where the bias of the baro-altimeter has been identified. $K_h$ is fixed at the value of 0.5 m/Nm.

$\sigma_{Vert} = Kv*\Delta Alt$ represents the influence of the variation in altitude from the last identification of the bias of the baro-altimeter. $K_v$ is a scale factor that depends on the altitude and is fixed at the following values:

$K_v = 13\ e^{-3}$ m/foot for an altitude greater than 18,000 feet;
$K_v = 23\ e^{-3}$ m/foot for an altitude in the range between 6,000 feet and 18,000 feet;
$K_v = 32\ e^{-3}$ m/foot for an altitude lower than 6,000 feet.

$\sigma_{Time} = Kt*\Delta t$ is the natural drift in the error with $K_t = 15$ m/h.

Through the hybridization, the GNSS receiver also allows the baro-altimeter to be calibrated. The use of a reset on the baro-altimetric measurement is particularly important in "coasting" operating mode (survival mode), in other words when an insufficient number of GPS pseudo-measurements is received. It is also possible to use a temperature-compensated baro-altimeter in order to reduce the residual errors, as long as a measurement of local temperature is available.

Accordingly, the hybridization consists in correcting the measurements of the inertial sensors using those of the additional sensors (GNSS, baro-altimeter). This is principally carried out in the Kalman filter $F_0$. A Kalman filter comprises a model for behaviour of the variables that it is desired to filter. Generally speaking, the filter is applied to the errors, in other words to the differences in measurements between inertial sensors and additional sensors. The model enables the error to be propagated for calculating a predicted error which is compared to the observation; the filter is reset with the innovation calculated from the difference between prediction and observation taking into account the gain of the filter. Usually, the propagation uses matrices with linear coefficients. It is also possible to use extended Kalman filters of a higher order. In order to meet the demands on integrity for a first level aircraft certification, this main filter is completed by several secondary Kalman filters Fi, normally one per satellite axis simultaneously in view. This processing of the integrity is principally achieved by a module for calculation of a protection radius and by a module for supervision of the integrity. The procedure for calculation of the protection radius is detailed below in the comments for FIG. 8.

There are several ways of carrying out the hybridization. Loose hybridization and tight hybridization are firstly differentiated. In the first, the observations represent the errors between the inertial navigation solution (position, speed) and the GPS navigation solution (position, speed), the receiver having previously resolved its navigation solution using the measurements along viewing axes. In the second, the observation is calculated by comparing each measurement along a viewing axis (coming from the GNSS receiver) with an equivalent viewing axis measurement calculated from the inertial position. As far as the baro-altimetric observation is concerned, this is generated by calculating the error between the baro-altimetric altitude and the hybrid altitude (in the case of the closed loop only). For our invention, the tight hybridization solution is naturally favoured since it is desired to be able to model the GPS measurement errors in the viewing axes.

Another distinction must be made between open-loop hybridization and closed-loop hybridization.

Figure 2:
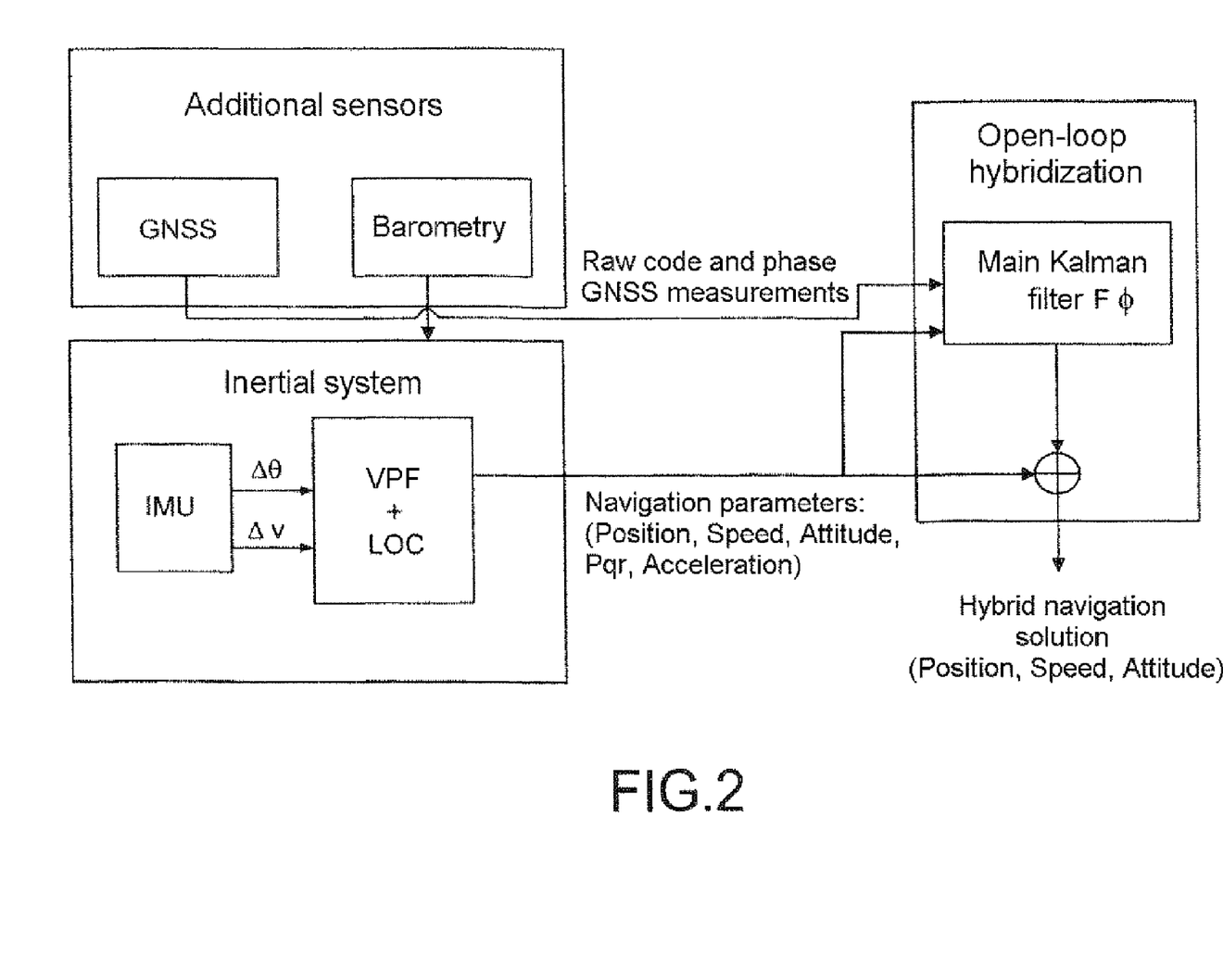
FIG. 2 shows the architecture of a navigation system with open-loop GNSS/inertial sensors hybridization.
Figure 3:
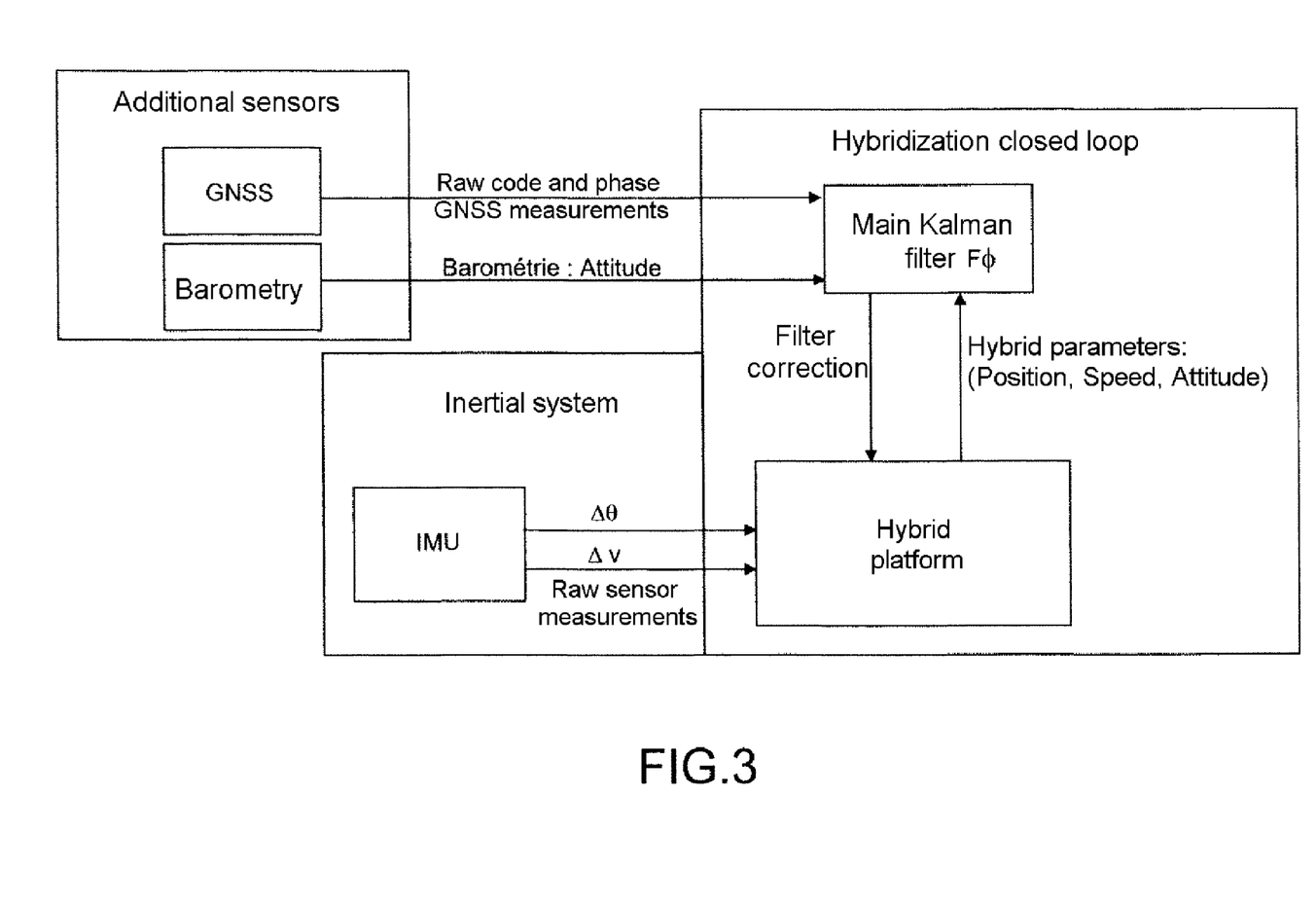
FIG. 3 shows the architecture of a navigation system with closed-loop GNSS/inertial sensors hybridization.

The two solutions are respectively illustrated by FIGS. 2 and 3. The advantage of the open-loop solution is that it can be implemented either within a host computer (the navigation or flight management computer for example) or else in the inertial navigation unit. Its drawbacks are notably that the observations vary in a non-linear model and that the baro-inertial vertical channel, which is already hybridized, is difficult to model. The advantage of the closed-loop solution is that the hybrid errors remain small. Its drawback is that a specific central processing unit must be added in order to manage the hybrid platform and that the knowledge of the parameters of the IMU and of the sensor processing carried out must be precise.

One of the main features of the invention, applicable to the two solutions—open-loop and closed-loop—is the combined use of the code measurements, which is conventional, and of the measurements of carrier phase, normally not used in the hybridization devices of the prior art. For the code measurement, the uncompensated outputs of pseudo-distance from the GNSS receiver, $PR_{code}$, are used. This pseudo-distance allows the pseudo-distance measured by the carrier phase $PR_{phase}$ to be initialized. This is then maintained by the measurement of accumulated phase (ACP) which represents very accurately the evolution of the pseudo-distance in the absence of jumps and cycles or of unlocking of the phase loop.

The equation for the model of variation over time of the pseudo-distance is the following:

$$PR_{code}(t) = PR_{true}(t) + Bias_{Clock(Rx)}(t) + Err_{Iono}(t) + Err_{tropo}(t) + Err_{Mpath,code}(t) + Err_{Ephemeris}(t) + Noise_{Rx,code}(t)$$

where the notations have the following meanings:

$Bias_{Clock(Rx)}(t)$: error in the receiver clock supplied by the internal oscillator;

$Err_{Iono}(t)$ and $Err_{tropo}(t)$ are the errors due to the passage through the atmospheric layers (the ionosphere and the troposphere, respectively);

$Err_{Mpath,Code}(t)$ is the error due to the multiple pathways;

$Err_{Ephemeris}(t)$ is a composite of the errors due to the relativistic errors and of the errors due to the clocks of the satellites, which are modelled by the same global state since it is not desired to dissociate them;

$Noise_{Rx,Code}(t)$ is the thermal noise.

In one possible embodiment, the pseudo-distance $PR_{phase}$ is initialized at the value of the pseudo-distance coming from the code at the time $t_0$ and is then maintained by the ACP according to the formula:

$$PR_{phase}(t) = PR_{Code}(t_0) + \sum_{u=t_0}^{t-dt} \Delta PR_{phase}(u)$$

where $\Delta PR_{phase}$ is the phase measurement and dt is the sampling period.

The variation in the phase measurement ACP must be calculated with precision in order to avoid drift. The sampling of the phase measurement must guarantee that the error on the pathway increment calculated with the phase can be modelled by the noise on the fractional part of the phase. The equation supplying the phase can be developed in the following manner:

$$\sum_{u=t_0}^{t-dt} \Delta PR_{phase}(u) = PR_{true}(t) - PR_{true}(t_0) + Bias_{Clock(Rx)}(t) -$$

$$Bias_{Clock(Rx)}(t_0) - (Err_{Iono}(t) - Err_{Iono}(t_0)) + Err_{Tropo}(t) -$$

$$Err_{Tropo}(t_0) + Err_{Mpath,Phase}(t) + Err_{Ephemeris}(t) + Noise_{Rx,Phase}(t)$$

Finally, the pseudo-distance calculated with the ACP can be written:

$$PR_{phase}(t) = PR_{true}(t) + Bias_{Clock(Rx)}(t) + Err_{Iono}(t_0) - (Err_{Iono}(t) - Err_{Iono}(t_0)) + Err_{tropo}(t) + Err_{Mpath,Code}(t_0) + Err_{Ephemeris,Code}(t_0) + Noise_{Rx,Code}(t_0) + Err_{Mpath,Phase}(t) + Err_{Ephemeris}(t) + Noise_{Rx,Phase}(t)$$

It will be noted that in this equation, certain errors are specific to the phase (notably the multiple pathways error and the noise, which are different between the pseudo-distances coming from the code and from the phase; they are denoted by specific notations $Err_{Code}$ or $Err_{Phase}$ in the equations). The other errors such as the atmospheric errors (due to the passage through the ionosphere and the troposphere), the ephemerides error and the error due to the receiver clock are common to the two measurements of pseudo-distance by the code and by the phase.

The pseudo-distance measured by the code can be written in the following manner:

$$PR_{code}(t) = PR_{true}(t) + Bias_{Clock(Rx)}(t) + Err_{Iono}(t_0) + Err_{Iono}(t) - Err_{Iono}(t_0) + Err_{tropo}(t) + Err_{Mpath,code}(t) + Err_{Ephemeris}(t) + Noise_{Rx,code}(t)$$

The standard DO229 defines corrections to be applied to the measurements in order to achieve a performance of the GNSS/GPS receiver conforming to the prescriptions. These corrections relate to the errors in the satellite clocks, the relativistic effect, the correction of the tropospheric errors and those of the ionospheric errors. The correction models for these errors are known to those skilled in the art. According to the invention, these corrections are simultaneously applied to the code measurements and to the phase measurements. For the correction of the errors in the satellite clocks, the absolute error on the code and the drift of the error on the phase are applied. For the relativistic effect, the tropospheric and ionospheric errors, the raw error is applied to the code and the variation of the errors between two measurements to the phase. It will be noted that the ionospheric error corrections are of opposite signs for the code and for the phase. Thus, the filter is capable of following the ionospheric variations over time and of identifying the initial error. These corrections are carried out based on data supplied by the GNSS receiver (ephemerides, data transmitted by the GNSS receiver for the correction of the ionospheric errors, etc.).

Thus, the last equation hereinabove is transformed in such a manner that the errors indicated may be considered as the residual errors after the corrections given by the error models.

In a GPS receiver, when only the C/A code is used, which is the case for civilian applications, the residual errors due to the multiple pathways and to the passage through the ionospheric layer have a significant impact on the overall performance of the receiver. These must be specifically taken into account in the definition of the filter model in order to reduce their effect on the hybridized navigation solution.

As far as the multiple pathways are concerned, one way of reducing the error is to use a narrow-band correlator, notably of the double-delta type. A narrow-band correlator combines a wide acquisition band and a narrow spacing of the replication codes. The noise on the measurements is reduced in a narrow-band correlator of this type, since the components of the advance and delayed signals are correlated and tend to compensate one another when the advance and delayed signals are simultaneous. In this case, the discrimination DLL is indeed less affected by the delayed multiple pathways. A narrow correlator of the double-delta type comprises a correlation function which is a linear combination of two reduced correlation functions:

$$\Delta\Delta(d) = 2*EL(d/2) - EL(d)$$

where $EL(d)$ is the correlation diagram corresponding to a delay of one C/A chip.

The linear combination hereinabove has a correlation diagram which has a non-zero response around the point of very short tracking, which drastically reduces the interference of the multiple pathways on the tracking. However, this technique does not allow sufficient correction of the proximity multiple pathways due to the reflections of the signals arriving at the antenna on the surface of the airplane. Complementary techniques for resolving errors are therefore needed, as indicated hereinbelow.

Figure 4:
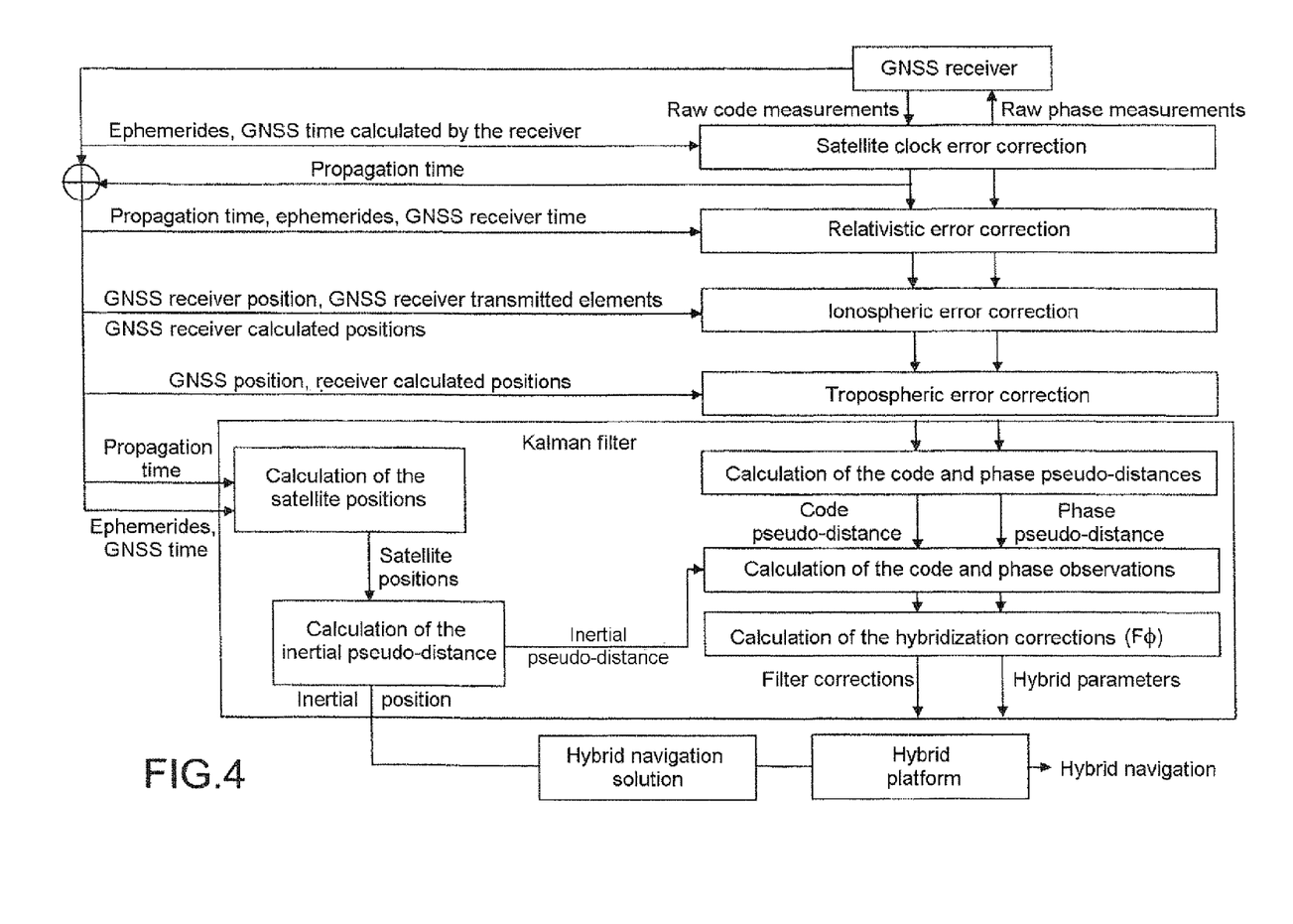
FIG. 4 shows the flow diagram of the processing steps for a navigation system with closed-loop GNSS/inertial sensors hybridization according to the invention.
Figure 5:
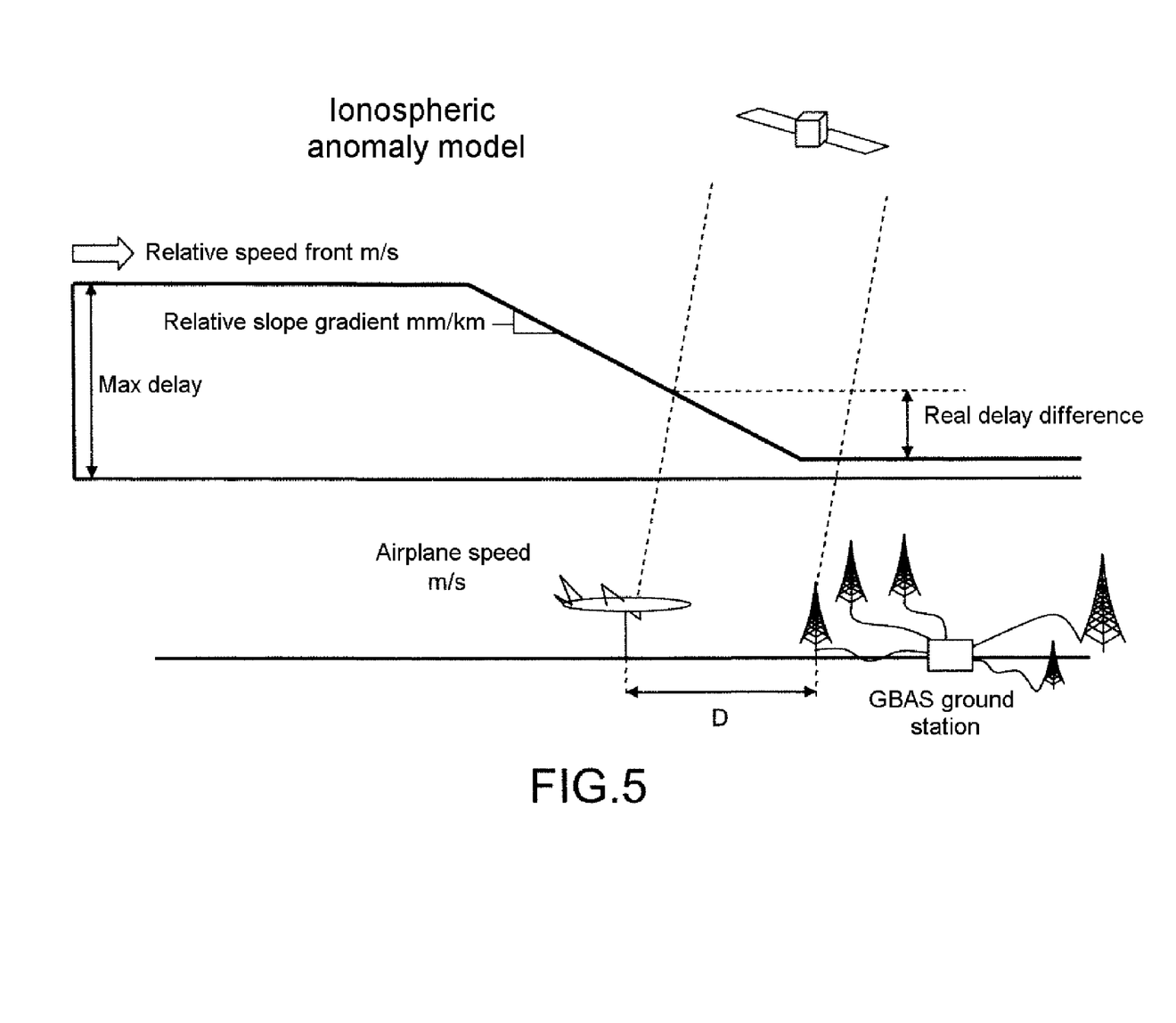
FIG. 5 illustrates a case of local anomaly of the ionosphere (front) which results in a poor GBAS ionospheric correction.

The flow diagrams of the processing operations applied for the error corrections in the case of a closed-loop hybridization architecture are shown in FIG. 4.

The observations supplied to the Kalman filter $F_0$ are the differences between the GNSS measurements and equivalent measurements calculated with inertial data. As already indicated, in an open loop, the inertial measurements are those that are supplied by the VPF and which are in no way corrected by the GNSS measurements. In a closed loop, the inertial measurements are corrected, in the hybridization platform, by taking into account the GNSS observations calculated by the filter. In the two architectures, the process comprises the same three steps: firstly, calculation and application of the various corrections to be applied to the raw code and phase measurements supplied by the GNSS receiver (one set of measurements per satellite viewing axis) so as to deduce from this the code and phase pseudo-distances; alternatively, the compensated measurements at the output of the GNSS receiver may be used, but in this case it must be ensured that these corrections conform to the standard DO229 and that they are coherent in phase and in code; subsequently, calculation of the code and phase observations by comparison with the measurements coming from the inertial navigation unit; finally, calculation of the hybridized corrections to be applied to the filter.

In the following part of the description, for one embodiment of the invention, the variables for the state vector of the filter, the propagation model and the reset model are provided. The various error correction models appearing in FIG. 4 are then detailed.

The state vector of the Kalman filter represents the hybridized navigation errors, the main errors of the inertial sensors and the errors in measurements from the additional sensors (GNSS and baro-altimeter). The table hereinbelow indicates, by way of example, the state variables that can be used to represent a propagation model according to one of the embodiments of the invention, these variables are chosen solely by way of illustration; in particular, this embodiment could be modified by modelling in a more precise manner the inertial defects (stability, scale factors and misalignments), however this would not really provide any further benefit within the context of the invention.

| Variables | Meaning |
|---|---|
| $\delta\Psi_x, \delta\Psi_y, \delta\Psi_z$ | Hybridized errors in the "tilt angles" in the platform reference frame |
| $\delta V_x, \delta V_y, \delta V_z$ | Hybridized errors in speed in the platform reference frame |
| $\delta\Theta_x, \delta\Theta_y$ | Hybridized errors in position in the platform reference frame |
| $\delta h$ | Hybridized error in altitude |
| $G_x, G_y, G_z$ | Drift of the gyrometer in the reference frame of the inertial navigation unit |
| $B_x, B_y, B_z$ | Drift of the accelerometer in the reference frame of the inertial navigation unit |
| $\delta Zb$ | Bias of the baro-altimeter |
| $Ag_x, Ag_y, Ag_z$ | Gravitational anomaly |
| Bh | Bias of the receiver clock |
| Dh | Drift of the receiver clock |
| Ah | Acceleration of the receiver clock |
| $Bic_n$ | Initial ionospheric bias on the code pseudo-distance of the channel n |
| $Bmc_n$ | Multiple pathway error on the code for the channel n |
| $Bip_n$ | Initial bias on the phase pseudo-distance on the channel n |
| $Bmp_n$ | Multiple pathway error on the phase for the channel n |
| $Ci_n$ | Variation in the ionospheric error on the channel n |
| $Ct_n$ | (common code and phase error) Variation in the tropospheric error on the channel n (common code and phase error) |
| $Cep_n$ | Variation in the ephemerides error on the channel n (common code and phase error) |

In order to present the propagation model used in this embodiment of the invention, the following variables and parameters are defined:

$V_X, V_Y, V_Z$ speed (in the platform reference frame)

$F_X, F_Y, F_Z$ specific forces (in the platform reference frame)

$\Omega_X, \Omega_Y, \Omega_Z$ Earth's rotation (in the platform reference frame)

$q_1\ q_2\ q_3\ q_4$ quaternion components p, q, r components of the rotation vector Z altitude dt sampling period $K_{b1}\ K_{b2}\ K_{b3}$ gain coefficients of the baro-inertial filter (open loop only)

The following compound terms are also defined:

$$a_1 = \frac{V_X}{Rt+Z} - \Omega_Y, \quad a_2 = \frac{V_Y}{Rt+Z} + \Omega_X, \quad a_3 = \frac{1}{Rt+Z}, \quad a_4 = \Omega_Z$$

$$M = \begin{pmatrix} \frac{q_1^2+q_2^2-q_3^2-q_4^2}{q_1^2+q_2^2+q_3^2+q_4^2} & \frac{2(q_2q_3-q_1q_4)}{q_1^2+q_2^2+q_3^2+q_4^2} & \frac{2(q_2q_4+q_1q_3)}{q_1^2+q_2^2+q_3^2+q_4^2} \\ \frac{2(q_2q_3+q_1q_4)}{q_1^2+q_2^2+q_3^2+q_4^2} & \frac{q_1^2-q_2^2+q_3^2-q_4^2}{q_1^2+q_2^2+q_3^2+q_4^2} & \frac{2(q_4q_3-q_1q_2)}{q_1^2+q_2^2+q_3^2+q_4^2} \\ \frac{2(q_2q_4-q_1q_3)}{q_1^2+q_2^2+q_3^2+q_4^2} & \frac{2(q_4q_3+q_1q_2)}{q_1^2+q_2^2+q_3^2+q_4^2} & \frac{q_1^2-q_2^2-q_3^2+q_4^2}{q_1^2+q_2^2+q_3^2+q_4^2} \end{pmatrix}$$

A certain number of known constants such as g, the gravitational constant, and $K_2$, the correction to gravity as a function of the altitude are also used in the propagation model. A certain number of adjustment parameters $\tau_x$ also allow the model to be optimized. They can be determined by simulation or by testing and are given in the following table:

| Abbreviation | Meaning |
|---|---|
| $\tau_{ACCELERO}$ | Time constant associated with the stability of the bias of the accelerometer |
| $\tau_{GYRO}$ | Time constant associated with the stability of the drift of the gyrometer |
| $\tau_{GRAVITY}$ | Constant for the model of gravitational anomaly |
| $\tau_{IONO,n}$ | Constant for the calculation of the variation in ionospheric error for the channel n |
| $\tau_{TROPO,n}$ | Constant for the calculation of the variation in tropospheric error for the channel n |
| $\tau_{Ephemeris,n}$ | Constant for the calculation of the variation in ephemerides error for the channel n |
| $\tau_{MULTIPATH,Code}$ | Constant for the calculation of the multiple pathway error on the code |
| $\tau_{MULTIPATH,Phase}$ | Constant for the calculation of the multiple pathway error on the phase |

The propagation equations are then as follows, noting that the state variables before propagation appear in the right-hand side of the equations and the state variables after propagation appear in the left-hand side of the equations:

$\delta\Psi_X = \delta\Psi_X + dt(a_4\delta\Psi_Y + a_1\delta\Psi_Z + M(1.1)*G_X + M(1.2)*G_Y + M(1.3)*G_Z)$ $\delta\Psi_Y = \delta\Psi_Y + dt(-a_4\delta\Psi_X + a_2\delta\Psi_Z + M(2.1)*G_X + M(2.2)*G_Y + M(2.3)*G_Z)$ $\delta\Psi_Z = \delta\Psi_Z + dt(-a_1\delta\Psi_X - a_2\delta\Psi_Y + M(3.1)*G_X + M(3.2)*G_Y + M(3.3)*G_Z)$ $\delta V_X = \delta V_X + dt(F_Z\delta\Psi_Y - F_Y\delta\Psi_Z + F_Z\delta\Theta_Y + M(1.1)*B_X + M(1.2)*B_Y + M(1.3)*B_Z)$ $\delta V_Y = \delta V_Y + dt(-F_Z \delta \Psi_X + F_X \delta \Psi_Z - F_Z \delta \theta_X + M(2.1)^* B_X + M(2.2)^* B_Y + M(2.3)^* B_Z$ The processing operations for the variation in vertical speed and for the variation in altitude in the closed-loop scenario are:

$\delta V_Z = \delta V_Z + dt[M(3.1)^* B_X + M(3.2)^* B_Y + M(3.3)^* B_Z + Ag_z - K_2 \delta h]$ $\delta h = -\delta V_Z dt$ On the horizontal channel $\delta \theta_X = \delta \theta_X + a_{31} dt \delta V_Y$ $\delta \theta_Y = \delta \theta_Y - a_{32} dt \delta V_X$ For the gyrometer and the accelerometer measurements, one example of propagation equations is given hereinbelow, it being understood that several sensor error models may be combined with the invention without modifying the latter:

$$G_{(X,Y,Z)} = \exp\left(-\frac{dt}{\tau_{GYRO}}\right) G_{(X,Y,Z)} \text{ and}$$

$$B_{(X,Y,Z)} = \exp\left(-\frac{dt}{\tau_{ACCELERO}}\right) B_{(X,Y,Z)}$$

For the gravitational correction:

$$Ag_X = \exp\left(-\frac{dt}{\tau_{gravity}}\right) Ag_X,$$

$$Ag_Y = \exp\left(-\frac{dt}{\tau_{gravity}}\right) Ag_Y \quad Ag_Z = \exp\left(-\frac{dt}{\tau_{gravity}}\right) Ag_Z$$

For the propagation of the code and phase measurement errors, for example Markov models of the 1$^{st}$ order or of higher order may be used, notably for the ionospheric variation and for n, function of the number of channels, we also have:

Common Terms:

Variation Ionosphere: $Ci_n = \exp\left(-\frac{dt}{\tau_{Iono,n}}\right) Ci_n$

Variation Ephemerides: $Cep_n = \exp\left(-\frac{dt}{\tau_{Ephemeris,n}}\right) Cep_n$ Variation Troposphere: $Ct_n = \exp\left(-\frac{dt}{\tau_{Tropo,n}}\right) Ct_n$ Code Only:

Multiple pathways: $Bmc_{Code,n} = \exp\left(\frac{-dt}{\tau_{Multipath,code,n}}\right) Bmc_{Code,n}$ Phase Only:

Multiple pathways: $Bmp_{Phase,n} = \exp\left(\frac{-dt}{\tau_{Multipath,phase,n}}\right) Bmp_{Phase,n}$ The Kalman filter is reset by the observations of the differences between inertial measurements and GNSS measurements, these comprising the measurements of pseudo-distances by the code and by the increment in path length (phase), respectively denoted $RawPR_i^{Code}$ and $\Sigma Raw\Delta PR_i^{Phase}$.

The algorithm receives a pseudo-distance which is corrected by using the models defined by the standard RTCA DO 229 whose results allow residual errors to subsist whose processing is detailed in the following part of the description:

Corrections for the satellite clocks: af0, af1, af2, Tgd (Group propagation time) and relativistic effect: $Cor_i^{ClockSat} + Cor_i^{Relativistic}$ Corrections for the error due to the troposphere: $Cor_i^{Tropo}$ Correction for the error due to the ionosphere: $Cor_i^{Iono}$ The compensated code pseudo-distance is then:

$PR_i^{GPS} = RawPR_i^{GPS} + Cor_i^{ClockSat} + Cor_i^{Relativistic} - Cor_i^{Iono} - Cor_i^{Tropo}$ The compensated phase measurement is:

$\Delta PR_i^{Phase} = Raw\Delta PR_i^{Phase} + \Delta Cor_i^{ClockSat} + \Delta Cor_i^{Relativistic} + \Delta Cor_i^{Iono} - \Delta Cor_i^{Tropo}$ ($\Delta COR_i$ is the Variation in the Correction $Cor_i$ Between Two Iterations)

The measured phase pseudo-distance is calculated by accumulating the compensated phase measurements. It is initialized with the compensated code pseudo-distance. The code and phase pseudo-distances are then used to calculate the observations.

The observation is directly a pseudo-distance error. According to one embodiment, the observation vector has 2n+1 coordinates if n is the number of viewing axes n for each of the pseudo-distances (code and phase) and 1 for the baro-altimeter (e.g. 21 coordinates for 10 viewing axes).

$Z_{Code,i} = PR_i^{Code} - PR_i^{INS}$ (code observation for the channel i, i varying from 1 to n)

$Z_{Phase,i} = PR_i^{Phase} - PR_i^{INS}$ (phase observation for the channel i)

$PR_i^{INS}$ is the pseudo-distance calculated from the inertial position.

$a_i = PosX_{Sat}^i - PosX_{INS}$ $b_i = PosY_{Sat}^i - PosY_{INS}$ $c_i = PosZ_{Sat}^i - PosZ_{INS}$ $PR_i^{INS} = f(a_i, b_i, c_i) = \sqrt{a_i^2 + b_i^2 + c_i^2}$ The following are defined:

$\delta a = PosX_{TRUE} - PosX_{INS}$ $\delta b = PosY_{TRUE} - PosY_{INS}$ $\delta c = PosZ_{TRUE} - PosZ_{INS}$ $PR_i^{TRUE} = f(a_i - \delta a, b_i - \delta b, c_i - \delta c)$ Using the results already presented, this leads to:

$Z_{Code,i} = PR_i^{TRUE} - PR_i^{INS} + Err_{Ephemeris}(t_0) + Err_{Iono}(t_0) + Err_{Tropo}(t_0)$ $Err_{Ephemeris}(t) - Err_{Ephemeris}(t_0) + Err_{Mpath,code}(t) + Err_{Iono}(t) - Err_{Iono}(t_0) + Err_{Tropo}(t) - Err_{Tropo}(t_0) + Noise_{Rx,code}(t) + Bias_{Clock(Rx)}(t)$ and $Z_{phase,i} = PR_i^{TRUE} - PR_i^{INS} + Err_{Ephemeris}(t_0) + Err_{Mpath,Code}(t_0) + Err_{Iono}(t_0) + $ -continued $Err_{Tropo}(t_0) + Noise_{Rx,Code}(t_0) + Err_{Ephemeris}(t) - Err_{Ephemeris}(t_0) +$ $Err_{Mpath,Phase}(t) - Err_{Mpath,Phase}(t_0) - (Err_{Iono}(t) - Err_{Iono}(t_0)) +$ $Err_{Tropo}(t) - Err_{Tropo}(t_0) + Bias_{Clock(Rx)}(t) + Noise_{Rx,Phase}(t)$ $PR_i^{TRUE} - PR_i^{INS} \approx -\alpha_i \delta a - \beta_i \delta b - \gamma_i \delta c$ $\alpha_i$, $\beta_i$ and $\gamma_i$ are the cosine directors for each measurement.

$$\alpha_i = a_i / PR_i^{INS} = \left.\frac{\partial f}{\partial a}\right)_{INS}$$

$$\beta_i = b_i / PR_i^{INS} = \left.\frac{\partial f}{\partial b}\right)_{INS}$$

$$\gamma_i = c_i / PR_i^{INS} = \left.\frac{\partial f}{\partial c}\right)_{INS}$$

The "inertial" pseudo-distance is calculated in the system of geocentric coordinates ECEF together with the satellite positions:

$PosX_{INS} = (Re - z_{INS}) * \cos(Lat_{INS}) * \cos(Long_{INS})$ $PosY_{INS} = (Re - z_{INS}) * \cos(Lat_{INS}) * \sin(Long_{INS})$ $PosZ_{INS} = (Re*(1-e^2) - z_{INS}) * \sin(Lat_{INS})$ $PosX_{True} = (Re - z_{True}) * \cos(Lat_{True}) * \cos(Long_{True})$ $PosY_{True} = (Re - z_{True}) * \cos(Lat_{True}) * \sin(Lat_{True})$ $PosZ_{True} = (Re*(1-e^2) - z_{True}) * \sin(Lat_{True})$ $$Re = \frac{R_0}{\sqrt{1 - e^2 \sin^2(Lat)}}$$

(with $R_0$ constant equal to 6378137 meters)
The following are also defined:

$\delta Lat = Lat_{True} - Lat_{INS}$ $\delta Long = Long_{True} - Long_{INS}$ $\delta z = z_{True} - z_{INS}$ Therefore:

$PR_i^{TRUE} - PR_i^{INS} = -\delta Lat * h\_Lat - \delta Long * h\_Long + \delta z * h\_Alt$ with:

$$h\_Lat = \alpha_i \left.\frac{\partial PosX}{\partial Lat}\right)_{INS} + \beta_i \left.\frac{\partial PosY}{\partial Lat}\right)_{INS} + \gamma_i \left.\frac{\partial PosZ}{\partial Lat}\right)_{INS}$$

$$h\_Long = \alpha_i \left.\frac{\partial PosX}{\partial Long}\right)_{INS} + \beta_i \left.\frac{\partial PosY}{\partial Long}\right)_{INS} + \gamma_i \left.\frac{\partial PosZ}{\partial Long}\right)_{INS}$$

$$h\_Alt = -\alpha_i \left.\frac{\partial PosX}{\partial z}\right)_{INS} - \beta_i \left.\frac{\partial PosY}{\partial z}\right)_{INS} - \gamma_i \left.\frac{\partial PosZ}{\partial z}\right)_{INS}$$

The following may be written:

$$\left.\frac{\partial PosX}{\partial Long}\right)_{INS} = -(Re - z_{INS}) * \cos(Lat_{INS}) * \sin(Long_{INS})$$

$$\left.\frac{\partial PosX}{\partial z}\right)_{INS} = -\cos(Lat_{INS}) * \cos(Long_{INS})$$

$$\left.\frac{\partial PosY}{\partial Long}\right)_{INS} = (Re - z_{INS}) * \cos(Lat_{INS}) * \cos(Long_{INS})$$

$$\left.\frac{\partial PosY}{\partial z}\right)_{INS} = -\cos(Lat_{INS}) * \sin(Long_{INS})$$

$$\left.\frac{\partial PosZ}{\partial Long}\right)_{INS} = 0$$

$$\left.\frac{\partial PosZ}{\partial z}\right)_{INS} = -\sin(Lat_{INS})$$

Assuming that the error on Re is small as a function of the latitude:

$$\left.\frac{\partial PosX}{\partial Lat}\right)_{INS} = -(Re - z_{INS}) * \sin(Lat_{INS}) * \cos(Long_{INS})$$

$$\left.\frac{\partial PosY}{\partial Lat}\right)_{INS} = -(Re - z_{INS}) * \sin(Lat_{INS}) * \sin(Long_{INS})$$

$$\left.\frac{\partial PosZ}{\partial Lat}\right)_{INS} = (Re*(1 - e^2) - z_{INS}) * \cos(Lat_{INS})$$

The errors on the hybrid position ($\delta\theta_x$ and $\delta\theta_y$ in the state vector of the filter) are calculated in the platform reference frame:

$$\delta Lat = \sin(\alpha)\delta\theta_x + \cos(\alpha)\delta\theta_y$$

$$\delta Long = \frac{1}{\cos(Lat_{INS})}[\sin(\alpha)\delta\theta_y - \cos(\alpha)\delta\theta_x]$$

where $\delta\theta_x$ and $\delta\theta_y$ are the differences between the hybrid position and the real position. Other solutions are possible, notably in the neighbourhood of one of the Earth's poles.

Lastly, according to the observation equation for a Kalman filter (Z=H * X), for each channel i) can be written $H[Z_{Code_i}, \delta\theta_x] = H[Z_{Phase_i}, \delta\theta_x] = -h\_Lat*\sin(\alpha) + h\_long*\cos(\alpha)/\cos(Lat_{INS})$ $H[Z_{Code_i}, \delta\theta_y] = H[Z_{Phase_i}, \delta\theta_y] = -h\_Lat*\cos(\alpha) - h\_long*\sin(\alpha)/\cos(Lat_{INS})$ $H[Z_{Code_i}, \delta\theta_z] = H[Z_{Phase_i}, \delta\theta_z] = h\_Alt$ $H[Z_{Code_i}, Bh] = H[Z_{Phase_i}, Bh] = 1$ As far as the states specific to the code measurements are concerned:

$H[Z_{code_i}, Bic_i] = 1$ $H[Z_{code_i}, Bmc_i] = 1$

As far as the states specific to the phase measurements are concerned:

$H[Z_{phase_i}, Bip_i] = 1$ $H[Z_{phase_i}, Bmp_i] = 1$

As far as the common terms are concerned:

$H[Z_{code_i}, Ct_i] = H[Z_{phase_i}, Ct_i] = 1$ $H[Z_{code_i}, Cep_i] = H[Z_{phase_i}, Cep_i] = 1$ $H[Z_{code_i}, Ci_i] = 1 \; H[Z_{phase_i}, Ci_i] = -1$ The error between the hybrid altitude and the baro-altimetric measurement (standard altitude) is also taken into account. The bias of the baro-altimeter is taken into account in the model:

$H[Z_{Baro}, \delta Z] = 1$ $H[Z_{Baro}, \delta Zb] = -1$

The appearances and disappearances of each of the satellites on the various channels must be managed. The filter establishes a balance between the various states. A new satellite introduces two new measurements (one of code and one of phase) whose errors are taken into account in the state vector. In order to take into account these measurements, it must be ensured that the balance already established is not modified. For this purpose, the new states can be decorrelated by working directly on the variance/covariance matrix.

The adjustment of the parameters specific to the errors in GPS measurements (initial variances and model noise) can be obtained by those skilled in the art from the following table:

| Component of the state vector | Adjustment of Q0 |
|---|---|
| Bh | Depends on the technology of the oscillator Rx |
| Dh | Depends on the technology of the oscillator Rx |
| Ah | Depends on the technology of the oscillator Rx |
| $Bic_n$ | Initial bias $PR_{code}$: This error is considered as a constant bias |
| $Bip_n$ | Initial bias $PR_{code}$: This error is considered as a constant bias |
| $Bmc_n$ | $\dfrac{2 \times P_{mpath,code}}{\tau_{mpath,code}}$ This component defines the impact of the multiple pathways on the code measurements (it depends on the correlation technique, DDC or Advance/Delay) |
| $Bmp_n$ | $\dfrac{2 \times P_{mpath,phase}}{\tau_{mpath,phase}}$ This component defines the impact of the multiple pathways on the phase measurements |
| $Ci_n$ | $\dfrac{2 \times P_{iono}}{\tau_{iono}}$ This component defines the variation in the errors due to the ionosphere |
| $Ct_n$ | $\dfrac{2 \times P_{tropo}}{\tau_{tropo}}$ This component defines the variation in the errors due to the troposphere |
| $Cep_n$ | $\dfrac{2 \times P_{ephemeris}}{\tau_{ephemeris}}$ This component defines the variation in the errors due to the ephemerides |

| Component of the state vector | Adjustment of σ0 |
|---|---|
| Bh | Depends on the performance of the oscillator |
| Dh | Depends on the performance of the oscillator |
| Ah | Depends on the performance of the oscillator |
| Sah | Depends on the performance of the oscillator |
| $Bic_n$ | $\sqrt{\sigma_{Iono}^2 + \sigma_{Tropo}^2 + \sigma_{Ephem}^2}$ |
| $Bip_n$ | $\sqrt{\sigma_{Iono}^2 + \sigma_{Tropo}^2 + \sigma_{Ephem}^2 + \sigma_{MpathCode}^2 + \sigma_{NoiseCode}^2}$ |
| $Bmc_n$ | Multiple pathway error on the code, dependent on the correlation technique, DDC or Advance/Delay |
| $Bmp_n$ | Multiple pathway error on the phase |
| $Ci_n$ | The variation is initialized to a value close to 0 |
| $Ct_n$ | The variation is initialized to a value close to 0 |
| $Cep_n$ | The variation is initialized to a value close to 0 |

The Kalman filter calculates the innovation Y which is the difference between the observation Z and the predicted value (H*X). The filter also calculates the standard deviation using the standard deviation of the noise and the predicted value of the variance/covariance matrix of the hybrid state vector P. The equations are as follows:

$Y = Z - H^*X$ $P_Y = H^* P^* H^t + R$ where R is the measurement of the variance of the noise. The innovation Y(i) is valid if $|Y(i)|^2 < K * P_Y(i,i)$ where K must be adapted as a function of the probability of a false alarm which is accepted.

If Y(i) is valid, it is used for the reset.

Now, the description of the various corrections applied to the measurements of the GNSS receiver will be reconsidered, starting with the application of the corrections included in the standard RTCA DO 229, which are not described here but which are known to those skilled in the art. Then, the residual errors are processed according to the principles of the invention.

Firstly, with regard to the ionospheric errors, the corrections of the standard allow significant residual errors to subsist and the pseudo-distance of the GNSS receiver is not the real pseudo-distance. This produces a divergence between the code and phase measurements and hence an error on the position calculated by the GNSS receiver. The residual error due to the ionosphere is taken into account by the state vector of the Kalman filter. 3 states per channel are used to describe this residual error:

The initial ionospheric bias on the code measurement; it should be noted that it is indeed this state that takes into account the initial ionospheric error on the code measurement but this state contains other initial errors;

The initial ionospheric bias on the measurement of $PR_{phase}$; it should be noted that it is indeed this state that takes into account the initial ionospheric error on the pseudo-range measurement calculated with the phase but this state contains other initial errors;

The variation in the ionospheric environment.

As already explained, the variations due to the passage through the ionosphere are of opposite signs. The bias and the variation in the state vector are therefore differentiated. Using the observations of code and of phase and the variation in the state vector, the variation in residual error can therefore be determined. As was explained in the passage relating to the propagation model of the Kalman filter, the terms of the propagation matrix H, the initial variance $P_0$ and the covariance of the noise Q relating to the initial bias due to the ionosphere together with its variation must be correctly adapted to the characteristics of the residual errors. The processing algorithm for the ionospheric errors must take into account two operational scenarios:

The first relates to the errors that are coherent with the model of residual errors;

The second relates to the challenges associated with the ionospheric gradient.

The resolution of the challenges associated with ionospheric gradient is one of the main problems to be dealt with in order to ensure the desired integrity for a precision approach. This resolution is carried out in different ways depending on the system for improving the precision of the GNSS system that is employed (GBAS, SBAS or ABAS). In the case of the GBAS and SBAS systems, corrections for the ionospheric errors are supplied by the ground stations or by the satellites. FIG. 6 illustrates a case where a local gradient affects the aircraft during its flight. In this case, the corrections supplied by the GBAS and SBAS systems are not well adapted and residual errors remain which increases the position error of the GNSS receiver. In the case where the aircraft uses a hybridization with an ABAS system, the state vector of the Kalman filter receives the corrections made on board which take into account the local gradient. The real error can therefore normally be taken into account by the filter. The model is adjusted in such a manner that it can incorporate through the various ionospheric states a coherent ionospheric gradient from the observed gradients (of the order of 10 cm/s).

The control of the innovation performed by the filter, which was described above, can also detect a drift in ionospheric gradient if it is carried out after the resetting of the residual error. Simulations have demonstrated the benefit of the combination of the code and phase measurements on the processing of the ionospheric errors.

As far as the errors due to the passage through the tropospheric layer are concerned, the correction model in the standard does not allow any significant errors to subsist. They are modelled via one specific state per channel. In the model according to the invention, the errors due to the troposphere, to the ephemerides and to the multiple pathways are therefore separated.

Concerning the errors due to the clocks and to the ephemerides of the satellites, the following procedures are applied.

For each satellite being tracked identified by its PRN code, the ephemerides give the satellite clock errors together with the parameters of the satellites orbits with their times of validity. These parameters are not perfect, which can lead to errors in the observations $Z_{code}$ and $Z_{phase}$; the ephemerides errors are visible, on the one hand, on the measurements (satellite clock) and, on the other, on the observations (errors in satellite position). These errors are due to:

Errors in the parameters of the errors in the satellite clocks and orbits;

Jumps in $PR_{code}$ and $PR_{phase}$ due to the periodic updates of the ephemerides when the new ephemerides are different from the old ones; without correction, the said jumps are either rejected by the filter or induce an imbalance in the latter.

These elements have been taken into account in the design of the Kalman filter:

In order to handle the errors, the residual errors are included in the state vector and supplied to the filter;

In order to handle the jumps, it is the raw measurements from the GNSS receiver without ephemerides correction that are supplied to the hybridization; the various corrections are then applied; it is thus possible to detect the update of the ephemerides and to estimate the jump produced on the pseudo-distance in order to correct it.

As far as the multiple pathways errors are concerned, the following processes are applied.

The residual multiple pathway errors are associated with the environment of the aircraft. These errors are due to the reflection of the waves containing the satellite signals on the ground, on buildings or on the structure of the airplane (cabin of the aircraft, dorsal fin, etc.). The most seriously affected case is that where the aircraft is navigating at the airport owing to the numerous buildings on the ground capable of interfering with the measurements. These errors occur if the delay between the reflected wave and the direct wave is less than a chip (i.e. around 300 m) for the code measurement and less than the wavelength (i.e. around 19 cm) for the phase measurement. It can therefore be seen that the phase measurement is less sensitive to the multiple pathways than the code measurement, which is an important advantage of the invention. On the phase measurement, there are two types of multiple pathways:

The multiple pathways produced by the structure of the airplane; if the multiple pathway has a constant impact on the phase measurement, it will not affect the phase accumulation which is used in the device according to the invention; in the case of a significant dynamic behaviour of the aircraft, the multiple pathway is no longer constant and its effect can be represented by a Markov noise with an amplitude of a few cm;

The multiple pathways produced by the external environment (ground, buildings, etc.); if the aircraft is stationary, the multiple pathway produces a bias varying slowly over the phase measurement owing to the movement of the satellites; if the aircraft is moving, the multiple pathway is random and can be represented by a white noise distribution whose standard deviation is a few cm.

In the two cases, the multiple pathway can produce a cycle jump. As has already been indicated, the use of narrow-band correlators, notably of the double-delta type, reduces the effect of the multiple pathways on the code measurements. It is also possible to optimize the position of the GNSS antenna on the aircraft. However, residual errors remain. In order to decrease their effect, it is possible to only take into account in the resetting process the satellites having a sufficiently high $C/N_0$. Lastly, taking into account the ultimately residual errors is carried out by the state variables representing the said residual errors. The terms of the propagation matrix of the filter H, of the initial variance $P_0$ and of the covariance of the noise Q relating to the residual code and phase errors are adjusted as a result.

As far as the internal errors of the GNSS receiver are concerned, the following processes are applied.

Regarding first of all the clock of the receiver, the corrections required on the pseudo-distance and on its variation can be adjusted by the user. By way of example, a frequency drift of 3 ppm/° C. (such as defined by the standard RTCA DO 229) leads to an error in pseudo-distance of 900 m/s/° C. An oscillator of the OXCO type can be used which will have superior performance characteristics than an oscillator of the TCXO type. The main errors of the receiver are modelled as state variables supplied to the filter (bias of receiver clock, drift of the clock, acceleration of the clock, sensitivity to the acceleration of the receiver). The initial bias and drift of the receiver clock together with their variances are determined by calculation of the errors on an initial GNSS pseudo-distance. The variance of the acceleration of the clock error and the sensitivity to the acceleration are determined by the characteristics of the clock. For these determinations, the measurements after corrections performed by the algorithm at the output of the receiver are used. The measurements corrected by the algorithm (essentially to remove the sat clock error) are taken, rather than the measurements corrected by the GPS which often correct the time errors.

As far as the thermal noise is concerned, the following correction processes are applied.

The signal processing for the receiver and the HF module introduce a white noise on the code and phase measurements. The standard deviation of this noise must be characterized prior to using the measurements in the filter.

With regard to the code:

$\sigma_{t,code}$ is the standard deviation of the thermal noise affecting the code $$\sigma_{t,code} = \lambda_C \sqrt{\frac{B_n D}{2SNR}\left(1 + \frac{2}{TSNR(2-D)}\right)} \quad (\text{in m})$$

with $\lambda_c$ the length of the chip (300 meters)
$B_n$ the bandwidth of the front end
D the spacing between the correlators
SNR signal-to-noise ratio in the code loop
T the pre-detection integration time
For a correlation of the DDC type, it must be multiplied by $\sqrt{2}$ Concerning the phase:

$\sigma_{t,phase}$ is the standard deviation of the thermal noise affecting the phase $$\sigma_{t,phase} = \frac{\lambda_L}{2\pi} \sqrt{\frac{B_1}{SNR}\left(1 + \frac{1}{2TSNR}\right)}$$

with $\lambda_L$ is the wavelength of the carrier
$B_1$ the bandwidth of the noise of the carrier loop
SNR the signal-to-noise ratio in the PLL
T the pre-detection integration time This noise is taken into account in the pre- and post-processing of the Kalman filter:

The pre-processing of the signal in the case of using narrow-band correlators of the double-delta type: in this case, the noise on the code is low (parameter D small);
The coefficients of the noise matrix for the Kalman filter are adjusted in order to take into account the code and phase measurement noises.

With regard to the loop errors, the following correction processes are applied.

A GNSS receiver uses DLLs and PLLs to determine the code and phase measurements. These loops introduce residual errors for the following reasons:

The dynamic variations create latences in the loops and therefore on the measurements;
A noisy signal can cause a cycle jump on the PLL which can make it unlock or else lead to an error of one cycle on the measurement.

A design of the loops adapted to the design dynamic behaviour of the aircraft can reduce these errors. It is however necessary to include the residues of these errors in the Kalman filter:

In order to handle the latency due to the dynamic behaviour of the carrier, the variance of the noise measurement is increased as a function of the said dynamic behaviour;
In order to handle the cycle jump of the phase loop, either the channels having too low an SNR can be eliminated from the hybridization, or the variation in $PR_{phase}$ can be tested in order to detect the cycle slip and reject the erroneous measurements.

Finally, the quality of the measurements at the input of the hybridization needs to be ensured before performing the reset. For this purpose, the following adaptations are made:

In order to ensure that the signals are correctly locked, the measurements of one channel are only used a few seconds after the indication of the correct status of the said channel has been received;
In order to ensure that the satellite position is sufficiently precise, reception of the ephemerides from the satellite are awaited (almanacs are not used);
In order to ensure that the measurements taken from one channel are sufficiently precise, they are only used beyond an elevation threshold for the corresponding satellite and beyond an SNR threshold for the received signal.

Figures 6A, 6B:
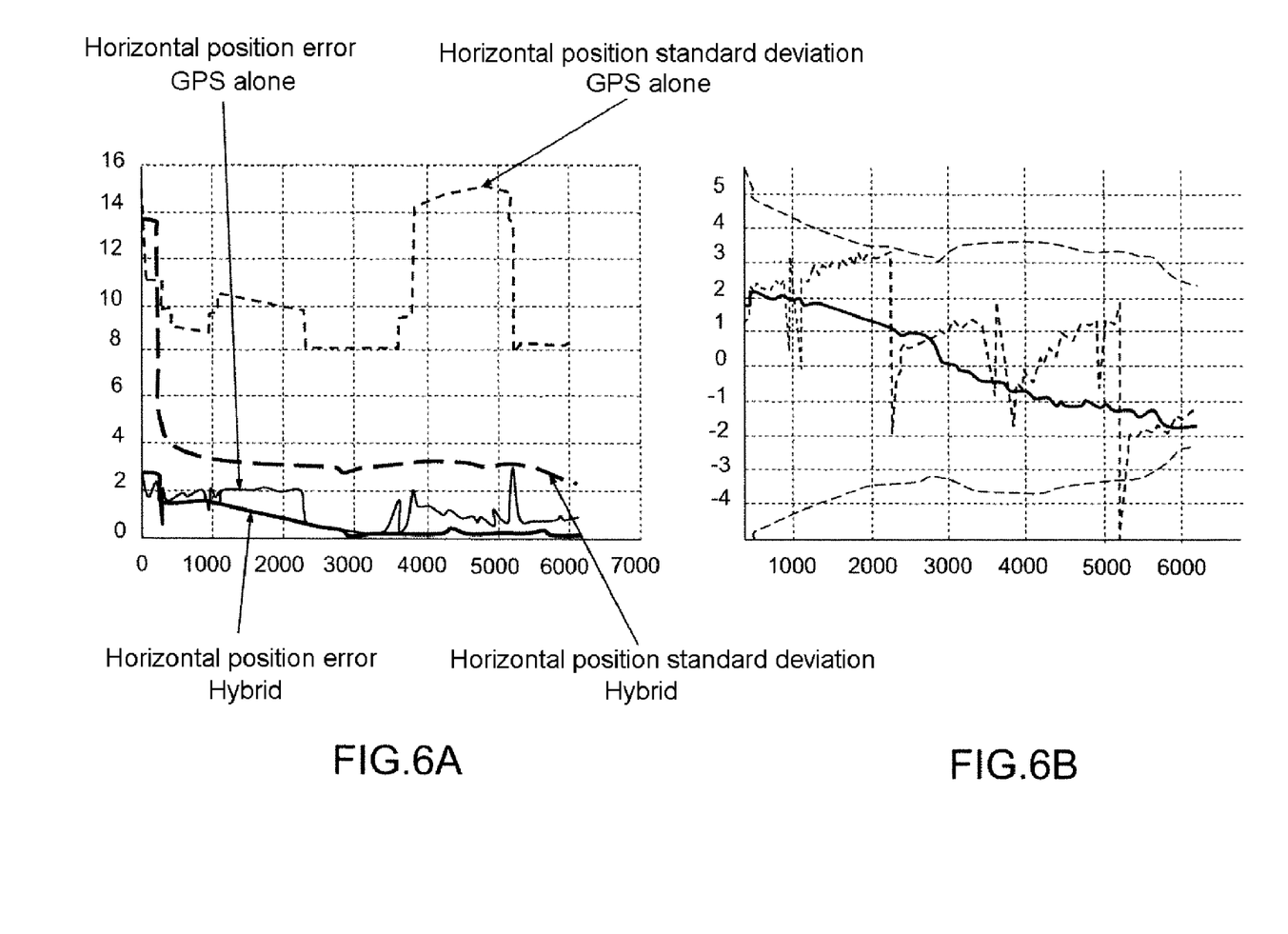
FIGS. 6A and 6B illustrate the improvement afforded by the invention on the precision of the hybridized measurements with respect to the GNSS measurements in the horizontal plane and in the vertical direction, respectively.

All these corrections for residual errors allow a greatly improved precision of the measurements of position of the aircraft to be obtained. This gain is illustrated by FIGS. 6A and 6B which compare, in the horizontal plane and in the vertical direction, respectively, the errors and standard deviations of the GPS alone without hybridization (solid lines and thin dashed lines, respectively) and with hybridization according to the invention (solid lines and thick dashed lines, respectively). The major part of this gain may be attributed to the corrections on the residual errors with respect to the DO 229 model due to the passage through the ionospheric layers which are greatly improved by the use in the Kalman filter of the phase measurements from the GNSS receiver.

Figure 7:
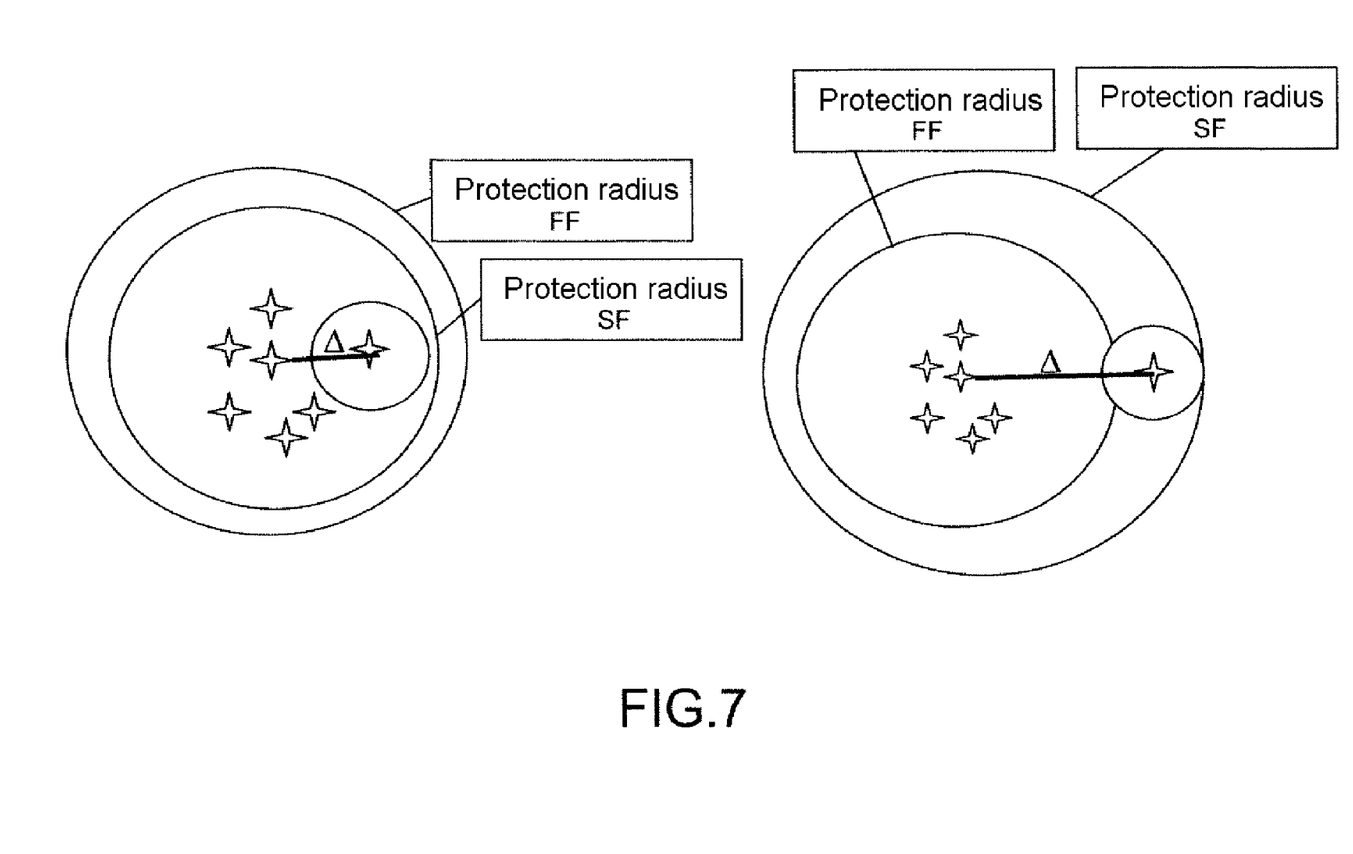
FIG. 7 illustrates the management structure for the integrity in a navigation system with GNSS/inertial sensors hybridization.

This gain in precision leads directly to a gain in the protection radii and hence to an improved integrity. FIG. 7 illustrates the calculation of the fault-free (FF) protection radii, which only take into account the noise, and in the case of satellite failure (SF) which takes into account:

The statistics of the difference between the main hybrid position and the position supplied by the secondary filter $F_i$ which is the furthest away from this main position;
The noise on the position supplied by this filter $F_i$.

The horizontal and vertical protection radii are reduced by around 25% in the simulations that have been performed.

The embodiments that have been described are non-limiting within the scope of the present invention which is defined by the claims that follow.

The invention claimed is:

1. A navigation system for a moving craft, comprising:
a first positioning module for processing of inertial sensor measurements;
a second positioning module comprising at least one multi-channel radiofrequency receiver, each channel of the at least one multi-channel radiofrequency receiver is capable of acquiring and tracking at least one carrier received from a satellite, of measuring the carrier's phase and of demodulating the carrier's signal in order to recover at least one modulation code; and
a calculation module for calculating navigation solutions by hybridization in at least one hybridization Kalman filter of results from the first positioning module with results of the second positioning module, wherein the calculation module for calculating the navigation solution includes in the hybridization at least one measurement of pathway increment carried out on at least one channel by integration of the measurements of the carrier phase tracked by said channel.

2. The navigation system according to claim 1, wherein at least one variable of a state vector of the at least one hybridization Kalman filter represents a part of errors on pseudo-random code and the carrier's phase measurements from the second positioning module due to a passage through ionospheric layers of atmosphere.

3. The navigation system according to claim 2, wherein the at least one variable represents a part of the errors on the pseudo-random code and the carrier's phase measurements from the second positioning module due to passage through ionospheric layers of atmosphere are chosen from a group comprising an ionospheric bias on a measurement of the pseudo-random code, an ionospheric bias on a measurement of the carrier's phase and a variation of the ionospheric environment.

4. The navigation system according to claim 1, wherein a part of errors on pseudo-random code and the carrier's phase measurements from the second positioning module due to multiple pathways of received signals are modeled in the calculation module for the navigation solution by two states, one for the pseudo-random code and one for the carrier's phase.

5. The navigation system according to claim 1, wherein at least one of variables of state vector of the at least one of hybridization Kalman filter represents, at least partially, a part of errors on the pseudo-random code and the carrier's phase measurements from the second positioning module due to errors in satellite clock and in ephemerides transmitted by the satellite.

6. The navigation system according to claim 1, wherein internal errors of the at least one multi-channel radiofrequency receiver comprise an error due to a receiver clock, an error due to a thermal noise of the at least one multi-channel radiofrequency receiver and a residual error due to processing loops of the at least one multi-channel radiofrequency receiver.

7. The navigation system according to claim 6, wherein the residual error caused by in the processing loops of dynamic behavior of the moving craft are corrected by widening range of variance of loop noise as a function of the dynamic behavior.

8. The navigation system according to claim 7, wherein phase lock loop errors due to a noisy signal are taken into account by rejecting the carrier's phase measurement variations corresponding to a low signal-to-noise ratio.

9. The navigation system according to claim 1, wherein management structure of the at least one multi-channel radiofrequency receiver allows channels of the at least one multi-channel radiofrequency receiver to supply measurements meeting quality criteria which can be parameterized.

10. The navigation system according to claim 9, wherein the measurements of one channel of the at least one multi-channel radiofrequency receiver are only used after a chosen delay following a reception of an indication of an availability status of said channel.

11. The navigation system according to claim 9, wherein the measurements of one channel of the at least one multi-channel radiofrequency receiver are only used beyond chosen thresholds in elevation of the satellite being tracked and in signal-to-noise ratio of the received signal.

12. The navigation system according to claim 1, wherein results from the calculation module for the navigation solution are supplied to the first positioning module for correcting inertial sensor measurements.

13. The navigation system according to claim 12, further comprising N Kalman filters in addition to the at least one hybridization Kalman filter, one per channel corresponding to a satellite in view.

14. The navigation system according to claim 13, wherein the N Kalman filters are used for calculating horizontal and vertical protection radii of the navigation solution.

15. The navigation system according to claim 1, wherein results from the calculation module are not supplied to the second positioning module in order to modify the carrier's phase measurements.

16. The navigation system according to claim 1, further comprising at least one narrow double-delta correlator.

17. The navigation system according to claim 1, wherein a partial navigation solution is calculated at an output of the second positioning module prior to being hybridized with outputs of the first positioning module.

18. The navigation system according to claim 1, wherein the second positioning module also comprises a baro-altimetric measurement sensor.

19. The navigation system according to claim 2, wherein the at least one variable of the state vector of the at least one hybridization Kalman filter represents a part of errors on measurements of the baro-altimetric sensor.

20. The navigation system according to claim 1, wherein at least one variable of state vector of the at least one hybridization Kalman filter represents a part of errors on the inertial sensor measurements.

21. A navigation method for a moving craft, the method comprising:
    a first step of processing measurements from inertial sensors;
    a second step of processing positioning signals from a multi-channel radiofrequency receiver, each channel being capable of acquiring and tracking at least one radiofrequency carrier received from a satellite, of measuring its phase and of demodulating the signal in order to recover at least one modulation code; and
    a step of calculating a navigation solution by hybridizing the output from the first step with the output of the second step in a processor comprising at least one Kalman filter, wherein said calculating step includes in the hybridization at least one measurement of pathway increment carried out on at least one satellite channel by integration of the measurements of the radiofrequency carrier phase tracked by said satellite channel.

* * * * *